United States Patent
Chittar et al.

(10) Patent No.: US 8,521,537 B2
(45) Date of Patent: Aug. 27, 2013

(54) DETECTION AND USE OF ACOUSTIC SIGNAL QUALITY INDICATORS

(75) Inventors: Naren Chittar, Mountain View, CA (US); Vikas Gulati, Mountain View, CA (US); Matthew Pratt, New York, NY (US); Harry Printz, San Francisco, CA (US)

(73) Assignee: Promptu Systems Corporation, Menlo Park, CA (US)

( * ) Notice: Subject to any disclaimer, the term of this patent is extended or adjusted under 35 U.S.C. 154(b) by 892 days.

(21) Appl. No.: 12/295,981

(22) PCT Filed: Apr. 3, 2007

(86) PCT No.: PCT/US2007/065891
§ 371 (c)(1),
(2), (4) Date: Apr. 23, 2009

(87) PCT Pub. No.: WO2007/118099
PCT Pub. Date: Oct. 18, 2007

(65) Prior Publication Data
US 2009/0299741 A1 Dec. 3, 2009

Related U.S. Application Data

(60) Provisional application No. 60/789,389, filed on Apr. 4, 2006, provisional application No. 60/789,211, filed on Apr. 3, 2006.

(51) Int. Cl.
*G10L 21/00* (2013.01)

(52) U.S. Cl.
USPC ........... 704/275; 704/246; 704/247; 704/251; 704/252

(58) Field of Classification Search
None
See application file for complete search history.

(56) References Cited

U.S. PATENT DOCUMENTS

| | | | | |
|---|---|---|---|---|
| 5,581,655 A | * | 12/1996 | Cohen et al. | 704/245 |
| 5,611,019 A | * | 3/1997 | Nakatoh et al. | 704/233 |
| 5,698,834 A | * | 12/1997 | Worthington et al. | 235/472.03 |
| 6,021,387 A | * | 2/2000 | Mozer et al. | 704/232 |
| 6,336,091 B1 | * | 1/2002 | Polikaitis et al. | 704/233 |
| 6,804,653 B2 | | 10/2004 | Gabel | |
| 2003/0167171 A1 | * | 9/2003 | Calderone et al. | 704/270 |
| 2005/0071169 A1 | * | 3/2005 | Steinbiss | 704/275 |
| 2005/0159959 A1 | * | 7/2005 | Benco et al. | 704/277 |
| 2005/0209858 A1 | * | 9/2005 | Zak | 704/275 |
| 2006/0028337 A1 | * | 2/2006 | Li | 340/539.1 |

* cited by examiner

*Primary Examiner* — Leonard Saint Cyr
(74) *Attorney, Agent, or Firm* — Michael A. Glenn; Perkins Coie LLP

(57) ABSTRACT

A computer-driven device assists a user in self-regulating speech control of the device. The device processes an input signal representing human speech to compute acoustic signal quality indicators indicating conditions likely to be problematic to speech recognition, and advises the user of those conditions.

36 Claims, 4 Drawing Sheets

DETECTION AND USE OF ACOUSTIC SIGNAL QUALITY INDICATORS

CROSS-REFERENCE TO RELATED APPLICATIONS

This application is a 371 National Phase entry of PCT/US2007/65891 filed 3 Apr. 2007, which claims the benefit of the following earlier-filed U.S. Provisional Applications in accordance 35 USC 119: (1) U.S. 60/789,211, filed 3 Apr. 2006 and (2) U.S. 60/789,389, filed 4 Apr. 2006. The entirety of the foregoing applications is hereby incorporated herein by reference.

COPYRIGHT NOTICE

Portions of this disclosure contain material which is subject to copyright protection. The copyright owner has no objection to the facsimile reproduction by anyone of the patent document or the patent disclosure, as it appears in Government patent office files or records, but otherwise reserves all copyright rights whatsoever.

BACKGROUND

1. Field of the Invention

The technical field of the invention concerns computer systems that perform automatic speech recognition ("ASR"), that is, computer systems that process and then transcribe, understand, or respond to human speech. The specific subfield is methods for improving user interaction with such systems, notably by automatically diagnosing faulty usage by the human operator.

2. Description of the Related Art

ASR concerns the processing of human speech by an automatic device, typically a computer, to transcribe, understand or respond to spoken input. Interacting with a mechanical device by spoken command is of course a great convenience. However, like human listeners to human speech, ASR systems are imperfect, and can commit errors in processing the speech supplied as input. Potential reasons for such errors include the presence of excessive environmental or channel noise in the audio input, speech that is heavily accented, use of words that are not known to the ASR system, faulty control or use of the system by the human operator, and other problems. Any one or more of these can cause the ASR system to function less than perfectly, that is, to transcribe one or more words incorrectly, to respond incorrectly to a spoken command, or not to respond at all.

As discussed below in greater detail, this disclosure introduces features designed to improve the performance of such systems by automatically diagnosing, from the audio input, certain common operating faults that human operators are likely to commit, and advising them of the faults and/or how to avoid these same faults in the future. This is distinct from most related or prior art in the area, as most related or prior inventions have concentrated on improving the ASR accuracy on a particular utterance.

SUMMARY

The present disclosure concerns a computer-driven device that assists a user in self-regulating speech control of the device. The device processes an input signal representing human speech to compute acoustic signal quality indicators indicating conditions likely to be problematic to speech recognition, and advises the user of those conditions.

The teachings of this disclosure may be implemented as a method, apparatus, logic circuit, storage medium, or a combination of these. This disclosure provides a number of other advantages and benefits, which should be apparent from the following description.

DETAILED DESCRIPTION

1. Hardware Components & Interconnections

Overall Structure

One aspect of the present disclosure concerns an ASR system. This system may be embodied by various hardware components and interconnections, with one example being described by the system 100 of FIG. 1. Broadly, the system 100 identifies when users (speakers) are making certain common operating mistakes, and advises them of the mistake and/or how to correct the mistake. This improves the accuracy, response pertinence, or other figure of merit of the overall speech recognition process as a whole. Optionally, the system 100 itself may additionally perform automatic speech recognition, or this may be delegated to another component (not shown).

Broadly, the system 100 includes an audio capture unit 150, result delivery unit 160, and recognition response unit 170. There are various data processing components of FIG. 1, such as the foregoing components and certain of their subcomponents. These may be implemented by one or more hardware devices, software devices, a portion of one or more hardware or software devices, or a combination of the foregoing. The makeup of these subcomponents is described in greater detail below, with reference to FIGS. 2-4.

Figure 1:
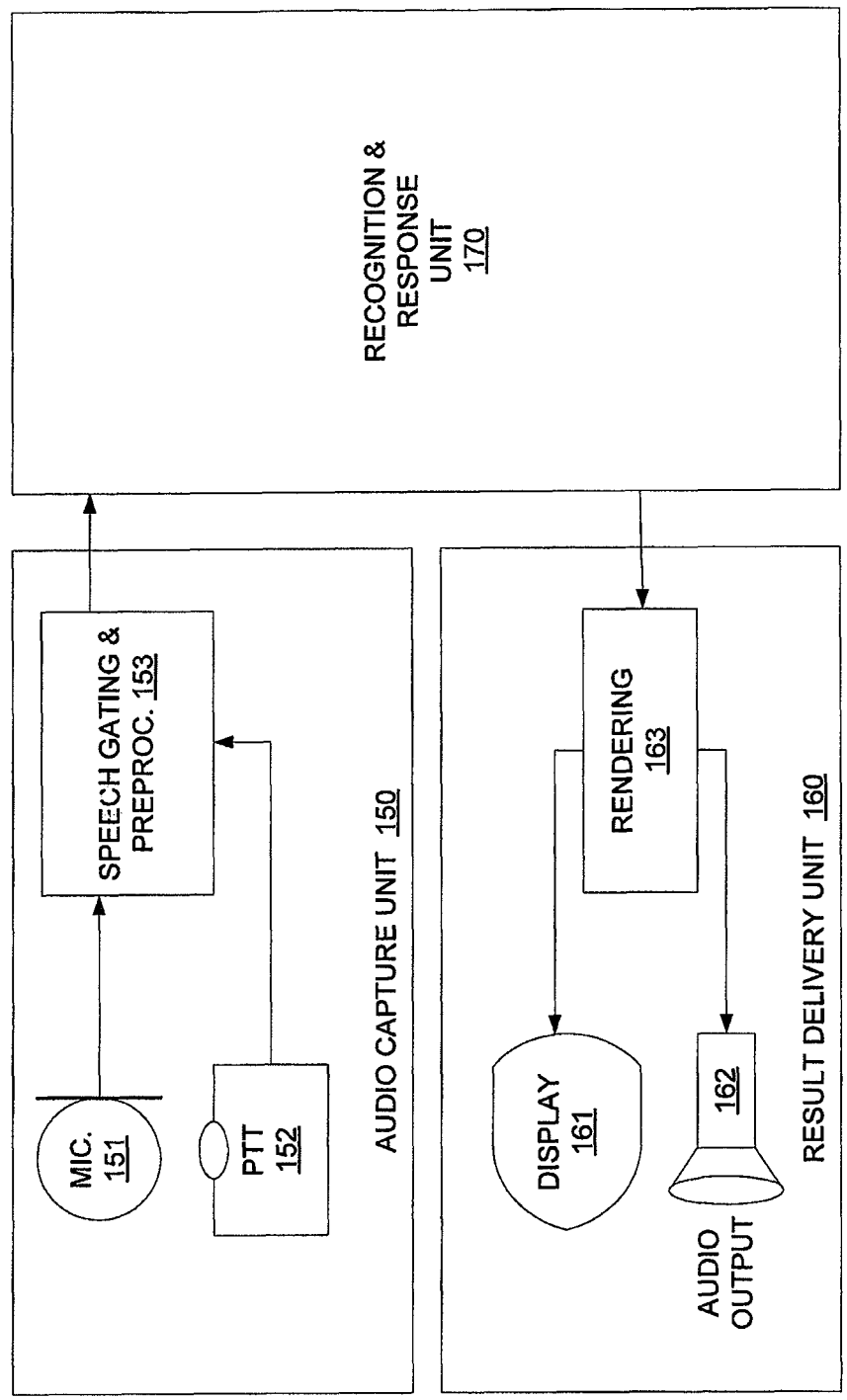
FIG. 1 is a block diagram showing an exemplary computer-driven ASR system.

Referring to FIG. 1 in greater detail, the audio capture unit 150 includes a microphone 151, speech gating and preprocessing unit 153, and a push to talk ("PTT") mechanism 152. The microphone 151 senses sound and relays it to the unit 153. In the illustrated example, the microphone 151 produces an analog electrical signal, however, the microphone 151 may produce a digital output signal if desired.

The unit 153 converts the analog signal from the microphone 151 into a digital signal, and optionally performs various front-end processing. The unit 153 also relays the front-end processed signal (if applicable) to the unit 170. In a different embodiment, front-end processing is performed at the unit 170 rather than the unit 153. In still another embodiment, the unit 170 performs both analog to digital conversion and front-end processing, in which case the unit 153 acts to propagate the analog signal from the microphone 151 to the unit 170. Front-end processing and other related operations are discussed in greater detail below under the heading "OPERATIONS."

The user-operated PTT 152 gates the unit 153. The PTT 152 comprises a mechanical or electromechanical switch, relay, trigger, button, pressure-transducer, screen icon, or any other device appropriate to this disclosure. The unit 153 is configured to ignore sound input unless it occurs while the PTT 152 is being activated. In one example, the PTT 152 is activated when the user presses the PTT button, and deactivated when the user releases the button. In a different example, the PTT 152 is activated by the first press, and deactivated by a second button press. Other arrangements are definitely possible, as will be apparent to ordinarily skilled artisans having the benefit of this disclosure.

Thus, the unit 153 must be activated before the speaker begins his/her utterance, maintained in an active state for the duration, and then deactivated after the speaker has completed his/her utterance. There are many advantages to gating the speech signal in this way, such as avoiding false response and reducing problems caused by background noise. Another advantage is not having to maintain the system in a continuously active state, which consumes communication and/or computing resources. That said, the inventors are aware of occasional problems with speakers activating an ASR system a little bit too late, or deactivating it a little too early. Likewise, people may speak too loudly or too softly into the microphone, or may hold the microphone too near or too far away. This disclosure presents a number of solutions to these problems, as detailed below.

Broadly, the unit 170 analyzes the signal from the unit 153. This includes performing speech recognition upon the signal from the unit 153. Furthermore, the unit 170 uses signals from the unit 153 to compute one or more acoustic signal quality indicators (SQIs). As explained below in greater detail, acoustic SQIs tell whether the signal from 153 exhibits certain predetermined conditions, each potentially problematic because it could interfere with the process of accurately performing speech recognition on unit 153's output signal.

In an alternative embodiment, the unit 153 may compute the SQIs instead of the unit 170 computing them. Or, the unit 153 may compute some SQIs, with the unit 170 computing others of the SQIs.

Another function of the unit 170 is to generate an output message as appropriate to the SQIs. For example, the unit 170 may provide one or more numeric codes identifying the related SQI or SQIs when one of the signal from 153 exhibits one of the predetermined conditions. Alternatively, the unit 170 may issue general purpose error messages, error messages specific to the problem detected, advice on how to correct the error, etc.

The result delivery unit 160 renders the output message of the unit 170, presenting the human user with appropriate human-comprehensible speech quality alerts. In this regard, the unit 160 includes a display 161 to convey visual information, and an audio speaker or other audio output 162 to convey sound. The rendering unit 163 manages the display 161 and audio output 162 to present human-comprehensible output as appropriate to the output of the unit 170. Without any intended limitation, the rendering unit 163 in one example may use a lookup table to cross-reference error codes, binary signals, or other compact representation of SQIs as output by the unit 170 in order to identify the appropriate action, e.g., presenting text or graphics at the display 161 or playing an audio snippet at the audio output 162. Instead of a lookup table, the rendering unit 163 may perform computation necessary to present a text message on the display 161 and/or a snippet of sound at the audio output 162, appropriate to the SQI produced by the unit 170. The presentation to the human user may occur visually, by the display 161 alone, aurally, by the speaker or other audio output 162 alone, or by both.

Although it may be part of the system 100, the system as illustrated does not include the apparatus, machine, computer, or other device being controlled by the speaker's utterances. In one example, the unit 170 may be coupled to the speech-controlled-device, or there may be a separate rendering unit (not shown) for the purpose of manifesting output of the recognition and response unit 170 in the form of machine-control commands. Different arrangements will be apparent to ordinarily skilled artisans, having the benefit of this disclosure.

One Example of Implementation

The system 100 may be implemented in a number of different environments. In one example, the system 100 is implemented as part of a cellular mobile telephone, PCS phone, satellite phone, radiotelephone, or other communications device. In this context, the telephone (not shown) includes the system 100 along with other components particular to telephone operation. Some examples include a transceiver, antenna, modulators, demodulators, and the like.

Continuing with this phone example, some components of the system 100, in one implementation, may employ existing hardware of the telephone rather than duplicating the same. For instance, the telephone's existing microphone may serve as the microphone 151. An existing keypad button, side button, or screen icon of the telephone may serve as the PTT 152 in addition to its unrelated telephony functions. An existing LCD display of the telephone may serve as the display 161. Likewise, an existing speaker or other audio output device may serve as the audio output 162. Similarly, existing logic circuitry, application specific integrated circuits (ASIC), stored programs, or other data processing implement may be enhanced, expanded, or otherwise modified to perform the functions of the units 153, 163, 170.

The data processing components such as 153, 170, 163 need not comprise a single physical apparatus. In fact, they need not be geographically co-located. For instance, the units 153/163 may be sited at the phone, with the unit 170 comprising a computer located at a base station, switch, or other remote facility.

Another Example of Implementation

As a different example, the system 100 may be incorporated in a remote control module for controlling a television, stereo, garage door, vehicle, or other apparatus. One example of a host system appropriate to this embodiment is disclosed in U.S. Pat. No. 7,047,196, issued on May 16, 2006 in the names of Calderone, Cook, and Foster. The foregoing patent is hereby incorporated herein by reference. In the present example, the audio capture unit 150 is integrated into a television remote control unit located at a residence (for example), whereas the recognition and response unit 170 is implemented in a computer located miles from the residence, for example, at a cable television source, distribution point, etc. The result delivery unit 160 in this example is implemented by a cable television set top box and/or commercially available television (which receives audio and video signals from the set top box). Alternatively, the components of the system 100 may be collocated in the same device or the same physical site.

Exemplary Digital Data Processing Apparatus

As mentioned above, data processing entities (such as the units 153, 163, 170 and/or their subcomponents) may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
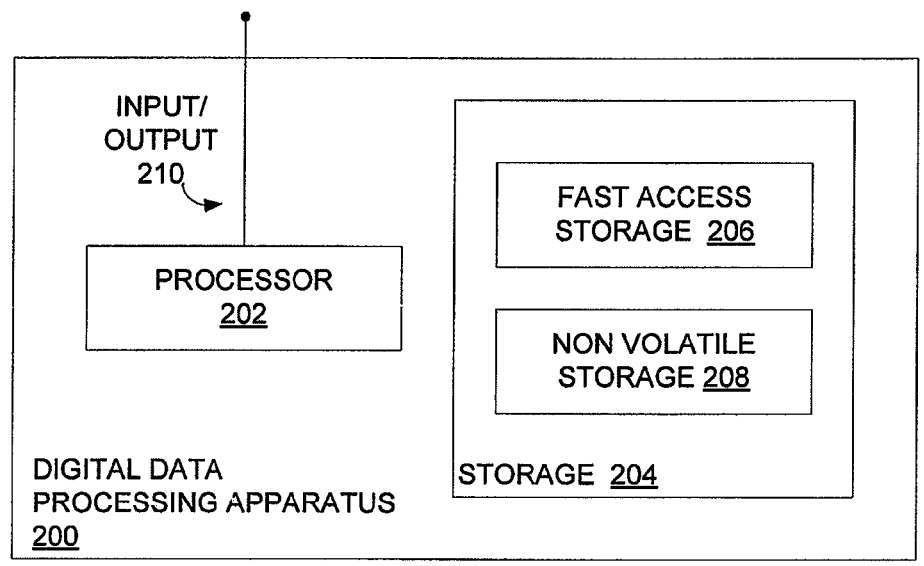
FIG. 2 is a block diagram of a digital data processing machine.
Figure 3:
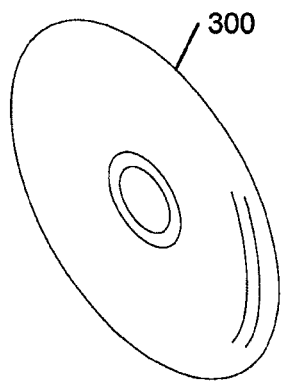
FIG. 3 shows an exemplary storage medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the system 100 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions (as described above), a different embodiment uses logic circuitry to implement processing features such as those described above.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
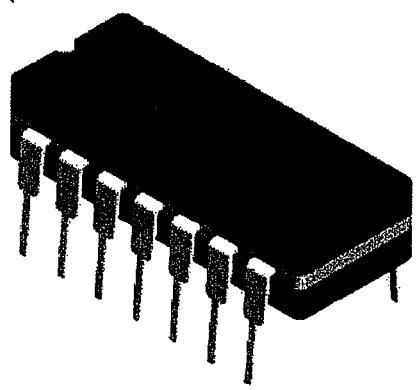
FIG. 4 is a perspective view of exemplary logic circuitry.

FIG. 4 shows an example of logic circuitry in the form of an integrated circuit 400.

2. Operation

Introduction

Having described various structural features of this disclosure, some operational aspects will now be described. The steps of any method, process, or algorithm described in connection with the embodiments disclosed herein may be embodied directly in hardware, in a software module executed by hardware, or in a combination of the two.

When the system 100 is operating, the audio capture unit 150 (and also the recognition and response unit 170) is idle until the user activates the PTT 152. At this point, audio capture begins. That is, a component such as 153 transduces the acoustic energy incident on the microphone 151 into an electrical signal (typically but not exclusively a sequence of waveform samples, a representation commonly known as "pulse-coded modulation" or "PCM"). The unit 153 optionally further processes this signal and ultimately supplies the signal, or a processed version thereof, to the recognition and response unit 170. The capture process continues until the PTT 152 is released, whereupon the unit 153 stops transducing and supplying input to the recognition and response unit 170. The captured data is referred to as the "audio input" or the "utterance," which the recognition and response unit 170 functions to transcribe, interpret, or respond in another way.

This disclosure anticipates that some users of the system 100 may inadvertently bungle operation of the PTT 152. A speaker might push the PTT 152 in too late, in which case the audio capture unit 150 would miss the starting portion of the spoken command, because that unit 150 has not yet been turned on, or put into an active state. Conversely, the user might release the PTT 152 too early, in which case the trailing portion of the command will likewise suffer the same fate, because the audio capture unit 150 was turned off or inactivated too early.

In these situations, the user's command is said to have been "truncated," at either the start or finish respectively. User faults causing these problems will be referred to as "PTT-in-late" and "PTT-out-early" respectively. Both faults can occur for the same spoken command, or each may occur separately.

This disclosure also anticipates that some users might either speak too loudly into the microphone 151, or conversely, speak too softly. An utterance that is too loud will be captured, but in a distorted and hence less intelligible form, since it will drive the audio capture unit 150 into its so-called non-linear operating region. Conversely, an utterance that is too soft is likely to be swamped by background noise, or simply lack sufficient audio information for successful operation of the recognition and response unit 170. These faults will be referred to by the shorthand "utterance-too-soft" and "utterance-too-loud."

Finally, two additional faults are contemplated, namely, the user holding the microphone too close to the user's mouth, or too far away. The first may induce problems because of breath noise and spectral distortion, the latter because the user's utterance is more likely to be corrupted by background noise, or nearby speakers. These faults will be referred to as "microphone-too-near" and "microphone-too-far."

This disclosure presents various techniques for automatically detecting when any one or more of the faults described above has occurred, and providing the user with an error message and/or corrective feedback. The results of the associated computations are indicators of which (if any) faults are present in the audio input. These indicators will be referred to variously as "acoustic signal quality indicators" or "acoustic SQIs," or simply as "signal quality indicators" or "SQIs."

Figure 5:
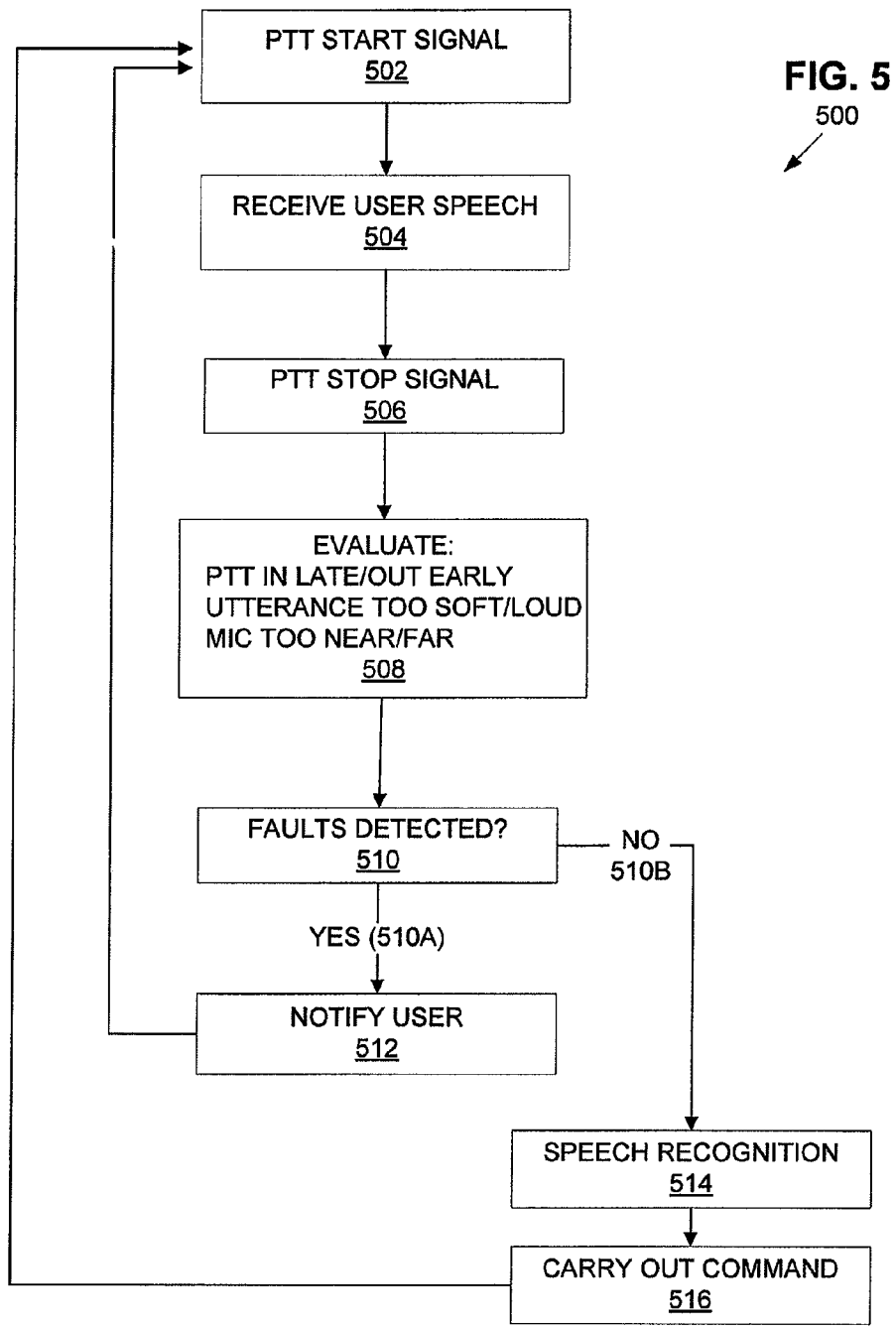
FIG. 5 is a flowchart showing one example of ASR operating sequence.

One Operational Sequence (FIG. 5)

Introduction

FIG. 5 shows an exemplary operating sequence 500. Broadly, this sequence assists a speaker in self-regulating the speaker's use of an ASR system. More particularly, the sequence 500 processes an input signal representing sampled audio to compute acoustic SQIs indicating conditions likely to be problematic to speech recognition. The sequence 500 also advises the user of any indicated problems and/or coaches the user in correcting his/her use of the ASR system.

the unit 170. Alternatively, these functions (except for propagating the signal to the unit 170) may be performed at the unit 170 instead. Moreover, instead of step 504, front-end processing may be performed elsewhere in the sequence 500, such as in step 508.

As to "front-end" processing, this refers to "front end" stage of speech recognition processing. A description of one example of such processing is found in the document "Distributed Speech Recognition (DSR) mel-cepstrum standard ES 201 108" published by the European Telecommunications Standards Institute.

In front-end processing, wherever performed, the utterance is represented as a sequence of digitized samples of the original (analog) speech waveform, an input mode known as PCM, as mentioned above. To this PCM stream, front-end processing applies the sequence of operations described in TABLE 1, below. All steps described here are not mandatory, as this disclosure contemplates various changes and omissions from this list, the following discussion serving as an example.

TABLE 1

Operations and Nomenclature of Typical Speech Processing Front End

| OPERATION | MEANING | INPUT | OUTPUT |
|---|---|---|---|
| Preemphasis | Digital filtering | PCM stream | PCM stream |
| Framing | Segmentation of the PCM stream into possibly-overlapping "frames" of PCM samples | Real frames | Real frames |
| Padding and Windowing | Expansion of the frame with trailing zeros; pointwise multiplication by a windowing function | Real frames | Real frames |
| FFT | Computation of the fast Fourier transform | Real frames | Complex frames |
| Magnitude Squaring | Computation of the squared magnitude of each complex value | Complex frames | Real frames |
| Mel Binning | Weighted, overlapping combination of squared magnitudes into Mel bins | Real frames | Mel bin values |
| Log | Computation of the logarithm of each mel bin value | Mel bin values | Log mel bin values |
| DCT | Computation of the discrete cosine transform, yielding Mel-frequency cepstral coefficient (MFCC) vectors | Log mel bin values | MFCC vectors |
| Normalization | Adjustment of MFCC vector values with respect to a neighborhood of preceding or trailing MFCC vectors | MFCC vectors | Normalized MFCC vectors |

For ease of explanation, but without any intended limitation, the example of FIG. 5 is described in the specific context of the specific system 100, described above.

Step 502

In step 502, the unit 153 detects that the user has activated the PTT 152, by any act appropriate to whatever mechanism is used to implement the PTT 152. Responsive to the PTT 152 being activated, the unit 153 is activated, or otherwise enabled.

Step 504

In step 504, having been activated by the PTT 152 input, the unit 153 collects sound from the microphone 151, this sound presumably including the user's utterances. Also in step 504, the unit 153 optionally processes the received audio input signal. This continues until the unit 153 senses that the operator has deactivated the PTT 152 (step 506).

Front-End Processing

As to the processing of step 504 that was mentioned above, there are various different implementations. In one, step 504 entails the unit 153 converting the analog signal from the microphone 151 into a digital signal, performing front-end processing, and propagating the front-end processed signal to The operations as described above implicitly divide the audio input or utterance into a sequence of (possibly-overlapping) real frames. In this context, the word "real" means a real number, as opposed to a complex number; a "real frame" is just a sequence of consecutive real values. To each frame is associated a Fast Fourier Transform (FFT) output. As this is a sequence of complex values, we will sometimes refer to this as a "complex frame." To each FFT output is associated a Mel-frequency cepstral coefficient (MFCC) vector, and a normalized MFCC vector. The computations described below freely and interchangeably refer to the utterance as a PCM stream, a sequence of (real) frames, a sequence of FFT outputs, a sequence of complex frames, a sequence of MFCC vectors, or a sequence of normalized MFCC vectors.

Step 506

As mentioned above, the processing activities of step 504 are concluded when the audio capture unit 150 detects that the PTT 152 has been deactivated.

Step 508

Responsive to the PTT stop signal (step 506), step 508 occurs. In step 508, the unit 170 evaluates the signal from the unit 153. More particularly, the unit 170 processes the signal to compute one or more acoustic SQIs. Each acoustic SQI indicates a predetermined condition of the input signal likely to provide a problem in applying speech recognition thereto. Specifically, in step 508, the unit 170 computes the PTT-in-late, PTT-out-early, utterance-too-soft, utterance-too-loud, microphone-too-near, and microphone-too-far acoustic SQIs mentioned above. The computation of these indicators is explained in greater detail below.

In this example, the SQIs are binary, where one value indicates a potential problem with speech recognition, and the other value indicates no problem. If step 508 finds that an SQI is satisfied (i.e., a problem exists), then that SQI is said to be "asserted."

Steps 510, 514, 516

In step 510, the unit 170 asks whether step 508 found any faults. Namely, this asks whether any SQIs were asserted. If not, the unit 170 moves on (510b) to perform speech recognition upon the input signal from the unit 153 (step 514). When the user's command is finally resolved, the unit 170 or another processing component (not shown) directs the recognized-command to the speech-controlled-device, and this device carries out the command; the foregoing acts occur in step 516, as illustrated.

As an alternative to the depicted flow, step 514 may be omitted, with speech recognition being performed at an earlier point instead. For example, speech recognition may be performed before, during, or after step 508. In this example, speech recognition is always applied, rather than conditionally according to step 510. Nevertheless, the act of carrying out the user's command (step 516) is aborted if step 510 finds faults, since 510 only advances to 516 based on a negative answer.

Step 512

If step 510 does find one or more faults, however, then step 510 proceeds (510a) to step 512. Here, the unit 170 prepares an appropriate output or command causing the result delivery unit 160 to render one or more human-comprehensible message(s) notifying the user of the detected fault(s). More particularly, the unit 170 provides an error code, binary signal, compressed code, SQI identifier, or other output to the rendering unit 163, whereupon the unit 163 causes the display 161 and/or audio output 162 to present an appropriate message to the user.

In one embodiment, the ultimate notification consists of a nonspecific error message. Another example is one or more error message(s) specific to the detected fault(s). Further, in addition to messages such as these (or instead of them), the unit 170 may trigger a message coaching the user to retry the speech command with certain corrections, e.g., activate PTT earlier, deactivate PTT later, speak most softly, speak more loudly, move the microphone closer, move the microphone away, etc.

Figure 6:
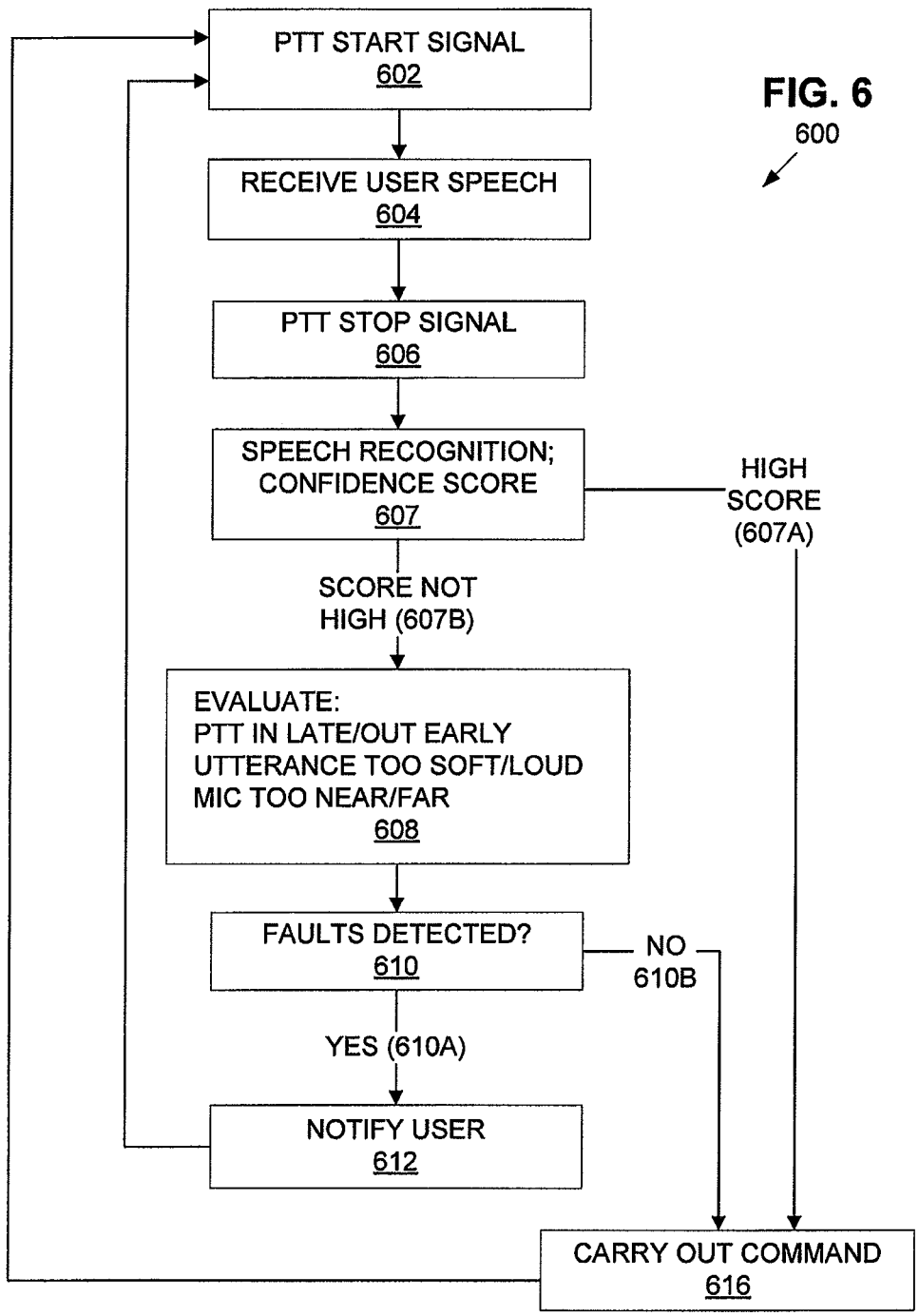
FIG. 6 is a flowchart showing a different example of ASR operating sequence.

Alternative Sequence (FIG. 6)

FIG. 6 describes a sequence 600 that is an alternative to the sequence 500 of FIG. 5. In this sequence, new step 607 has been inserted. Steps 602, 604, 606, 608, 610, 612, and 616 occur substantially as discussed above in conjunction with counterparts 502, 504, 506, 508, 510, 512, and 516 (respectively) from FIG. 5. Furthermore, front-end processing and other non-illustrated detail occur substantially as in FIG. 5.

In the illustrated example, the unit 170 does not perform speech recognition conditionally. Rather, speech recognition occurs for each utterance (step 607), per the normal operating sequence 600. Along with speech recognition, step 607 includes an act of computing an utterance confidence score. The use of this confidence score is now explained.

The preceding description explained how to diagnose, by automatic means, certain common errors that users make, when operating ASR systems. The diagnostic methods described are reasonably accurate; however, they are not perfect. Therefore it is possible that the SQI analysis (step 508) may diagnose a user error, when in fact no such error, or one that has no substantial impact on the correct operation of the system, has occurred. Reporting such false diagnostic information to users in such cases could be annoying and possibly detrimental.

For this reason, the confidence scoring operation (step 607) is added to determine how likely the speech recognition result is to contain one or more errors, therefore allowing for the SQI analysis to be skipped if the speech recognition result is particularly trustworthy. In other words, the utterance confidence score represents the probability or likelihood that the speech recognition output is accurate, i.e., the machine-resolved speech matches what the user said.

As illustrated, step 607 compares the utterance confidence score with a prescribed threshold. Then, if the utterance confidence exceeds the threshold (607a), steps 608, 610, 612 are omitted. Here, step 607 proceeds to step 616, where the system 100 carries out the uttered command. If step 607 finds that utterance confidence does not exceed the threshold (607b), then steps 608, 610, 612, 616 are carried out in the same manner as their counterpart of FIG. 5. As an alternative, step 607 may be performed after step 608, in which case the sequence 600 always performs SQI analysis 608, but skips 610/612 in cases presenting a sufficiently high utterance confidence.

Confidence Thresholding for Signal Quality Indicator Reporting

Some further details about the utterance confidence, and a more particular example follow. This example is referred to as Confidence Thresholding for Signal Quality Indicator Reporting, or just Confidence Thresholding for short.

As previously discussed, the diagnostic methods described so far could falsely indicate a user error under some circumstances. For this reason, before reporting any user errors, it is beneficial to apply an additional test, to determine if an error with substantial impact has occurred. This example describes such a test. The test recognizes that the output of an ASR system comprises not only a "decoding" of the audio input supplied (which generally comprises a textual transcription of the input, possibly supplemented with a meaning or interpretation of the transcription), but also a "confidence score." That is, the output is a pair: <decoding, confidence score>. Here the confidence score is a number that may be interpreted, with respect to an appropriate scale, as the probability that the decoding is correct. For instance, if the scale goes from zero to one thousand, then a confidence score of 975 would reflect a very high probability that the associated decoding is correct, whereas a confidence score of 47 on this same scale would reflect a very low probability that the decoding is correct.

Therefore, given an utterance that yields a particular <decoding, confidence score> pair, the confidence score may be used in conjunction with the previously computed SQI values, for the same utterance, in the following manner: compare the confidence score with a predetermined threshold, and report a user operating error, based upon the SQI values, only if the confidence score falls below the given threshold.

The details of Confidence Thresholding are expressed in TABLE 1A below, which is executed for each complete utterance. This and subsequent similar tables have been expressed using the conventions of the computer programming language known as "C++", for clarity and concision. Details of the C++ language may be found for instance in "The C++ Programming Language," by Bjarne Stroustrup, ISBN 0-201-88954-4, published by Addison-Wesley, copyright 1997. However, TABLE 1A (and other tables herein) do not necessarily constitute legal and executable C++ code.

TABLE 1A

Confidence Thresholding for Signal Quality Indicator Reporting

| | |
|---|---|
| (1) | // Constants |
| (2) | SQI_REPORTING_THRESHOLD = (experimentally determined value); |
| (3) | |
| (4) | // Main Algorithm |
| (5) | confidence = (confidence score for the utterance); |
| (6) | SQIset = (set of SQI values computed for the utterance); |
| (7) | |
| (8) | // test |
| (9) | if (confidence < SQI_REPORTING_THRESHOLD) { |
| (10) | (report SQIs to the user, if asserted); |
| (11) | } |
| (12) | else { |
| (13) | (do no report SQIs to the user, |
| (14) | accept utterance decoding and proceed); |
| (15) | } |

The following are some possible elaborations of Confidence Thresholding, and even further modifications will be evident to one skilled in the art, having the benefit of this disclosure. One modification includes SQI-Dependent reporting thresholds. In other words, this uses distinct reporting thresholds, based upon the SQI in question, to decide whether to report that SQI (if asserted) to the user.

A different modification relates to SQI Severity Measures. With severity measures, the SQI itself (or a separate measure) indicates the degree by which the associated fault has occurred. Thus, SQI severity measures provide increased information relative to the embodiment where SQIs are binary. As to the implementation of severity measures in confidence thresholding, one example is where the decision to report an asserted SQI is conditioned on some function of the severity measure of a given SQI along with the confidence score. In other words, an SQI may be asserted, but if the severity measure is low and the confidence score is high, the system 100 would suspend issuance of the alert to the user. A more particular example of such a function is a linear combination of the severity measure and the confidence score, that is, an expression of form A×(severity measure)+B×(confidence score), where A and B are appropriately chosen constants. Another example of such a function is a neural network of the severity measure and the confidence score, as described in "Pattern Classification" by Richard O. Duda, Peter E. Hart and David G. Stork, ISBN 0-471-05669-3. Other variations are possible. Some exemplary SQI severity measures are discussed below.

SQI Computations: PTT-in-Late

In the following example, the computation of the PTT-in-late SQI works by identifying the first frame of the utterance that contains valid speech. If this frame lies within a predetermined window of the start of the utterance—in other words, if the first frame of valid speech lies too close to the nominal start of the utterance—then the state of the PTT-in-late SQI is affirmative.

Computation of the first frame of valid speech requires operations to detect whether or not the frame contains speech, a process known as "speech detection." The example below illustrates one method for performing speech detection. However, ordinarily skilled artisans (having the benefit of this disclosure) will recognize the computation of the PTT-in-late SQI may employ this or a variety of other known speech detection techniques.

The exemplary method of speech detection is based on the raw acoustic energy contained in the frame. However, the inventors' research has shown that people often emit breath noise prior to speaking. Therefore using the raw acoustic energy to detect speech can lead to false assertion of the PTT-in-late SQI, even though the user inserted an adequate delay between pressing the PTT button and starting to speak. For this reason, one optional enhancement is to modify the exemplary speech detection algorithm to exclude the raw acoustic energy due to breath noise. This is done by excluding energy below a certain frequency in the frame power spectrum.

TABLE 2 (below) expresses the details of the exemplary computation. In this example, the sequence as shown is executed once for each complete utterance.

TABLE 2

PTT-in-late SQI

| | |
|---|---|
| (1) | // Constants |
| (2) | SILENCE_DETECTION_FRAMES_PTTIN = (typically 2 or 3); |
| (3) | BREATH_NOISE_FILTER_BIN = (FFT bin corresponding to 150 Hz); |
| (4) | SPEECH_THRESHOLD = (experimentally derived value); |
| (5) | FFT_BIN_LIMIT = ((N/2), where N is the number of FFT bins); |
| (6) | |
| (7) | // Initialization |
| (8) | frameCounter = 0; |
| (9) | firstSpeechFrame = −1; |
| (10) | |
| (11) | // Main Algorithm |
| (12) | // utterance loop |
| (13) | for each frame of the utterance { |
| (14) | // accumulate frame power |
| (15) | breathFilteredFramePower = 0; |
| (16) | for (i = 0; i <= FFT_BIN_LIMIT; i = i + 1) { |
| (17) | if (i > BREATH_NOISE_FILTER_BIN) { |
| (18) | breathFilteredFramePower = |
| (19) | breathFilteredFramePower + |
| (20) | (bin i of FFT magnitude squared output); |
| (21) | } |
| (22) | } |
| (23) | // record first speech frame |
| (24) | if ((breathFilteredFramePower > SPEECH_THRESHOLD) && |
| (25) | (firstSpeechFrame < 0)) { |
| (26) | firstSpeechFrame = frameCounter; |
| (27) | } |
| (28) | // increment frameCounter |
| (29) | frameCounter = frameCounter + 1; |
| (30) | } |
| (31) | |
| (32) | // SQI determination |
| (33) | if ((0 <= firstSpeechFrame) && |
| (34) | (firstSpeechFrame <= SILENCE_DETECTION_FRAMES_PTTIN)) { |
| (35) | (assert PTT-in-late SQI); |
| (36) | } |
| (37) | else { |
| (38) | (do not assert PTT-in-late SQI); |
| (39) | } |

The following points are helpful to interpret the contents of TABLE 2.

First, the constants listed on lines (2) through (5) of TABLE 2 are understood to be adjustable, to provide various realizations of the algorithm. Such adjustments will typically be made to conform with particulars of the physical apparatus being used, or with other details of the front end specification, such as the number of FFT bins. In particular, by adjustment of the constant BREATH_NOISE_FILTER_BIN, the degree of breath noise filtering may be adjusted, including eliminating such filtering entirely, by setting this constant to the value of minus one. This disclosure contemplates these and any further variations as may be apparent to those of ordinary skill, having the benefit of this disclosure.

Second, while 150 Hz is given as one exemplary FFT bin, ordinarily skilled artisans (having the benefit of this disclosure) may recognize other suitable bins.

In the context of confidence thresholding, the notion of a "severity measure" was introduced above. A "severity measure" for the PTT-in-late SQI may be determined as a function of one or more of (1) the degree to which breathFilteredFramePower exceeds SPEECH_THRESHOLD for each frame, in line (24) of TABLE 2, and (2) the degree to which SILENCE_DETECTION_FRAMES_PTTIN exceeds firstSpeechFrame in line (34) of TABLE 2. One version of the functional form of this severity measure may be a linear combination of the elements just enumerated, with appropriately chosen constants. Another version of the functional form may be a neural network of the elements just enumerated. Other variations are possible.

SQI Computations: PTT-Out-Early

In the following example, the computation of the PTT-out-early SQI works by identifying the last frame of the utterance that contains valid speech. If this frame lies within a predetermined window of the end of the utterance—in other words, if the last frame of valid speech lies too close to the nominal end of the utterance—then the condition of the PTT-out-early SQI is affirmative.

As in the PTT-in-late algorithm, this computation is based upon speech detection, for which one exemplary technique is shown. Nevertheless, ordinarily skilled artisans (having the benefit of this disclosure) will recognize the computation of the PTT-out-early SQI may employ this or a variety of other known speech detection techniques.

The details of the computation are expressed in TABLE 3 below, which is executed for each complete utterance.

TABLE 3

PTT-out-early SQI

| (1) | // Constants |
| (2) | SILENCE_DETECTION_FRAMES_PTTOUT = (typically 2 or 3); |
| (3) | BREATH_NOISE_FILTER_BIN = (FFT bin corresponding to 150 Hz); |
| (4) | SPEECH_THRESHOLD = (experimentally derived value); |
| (5) | FFT_BIN_LIMIT = ((N/2), where N is the number of FFT bins); |
| (6) | |
| (7) | // Initialization |
| (8) | frameCounter = 0; |
| (9) | lastSpeechFrame = −1; |
| (10) | |
| (11) | // Main Algorithm |
| (12) | // utterance loop |
| (13) | for each frame of the utterance { |
| (14) |     // accumulate frame power |
| (15) |     breathFilteredFramePower = 0; |
| (16) |     for (i = 0; i <= FFT_BIN_LIMIT; i = i + 1) { |
| (17) |       if (i > BREATH_NOISE_FILTER_BIN) { |
| (18) |         breathFilteredFramePower = |
| (19) |           breathFilteredFramePower + |
| (20) |           (bin i of FFT magnitude squared output); |
| (21) |       } |
| (22) |     } |
| (23) |     // record first speech frame |
| (24) |     if ((breathFilteredFramePower > SPEECH_THRESHOLD)) { |

TABLE 3-continued

PTT-out-early SQI

| (25) |       lastSpeechFrame = frameCounter; |
| (26) |     } |
| (27) |     // increment frameCounter |
| (28) |     frameCounter = frameCounter + 1; |
| (29) | } |
| (30) | |
| (31) | // SQI determination |
| (32) | if ((0 <= lastSpeechFrame) && |
| (33) |     ((frameCounter − lastSpeechFrame) <= |
| (34) |      SILENCE_DETECTION_FRAMES_PTTOUT)) { |
| (35) |     (assert PTT-out-early SQI); |
| (36) | } |
| (37) | else { |
| (38) |     (do not assert PTT-out-early SQI); |
| (39) | } |

Points made above to interpret the PTT-in-late computation apply to this computation as well, mutatis mutandis.

In the context of confidence thresholding, the notion of a "severity measure" was introduced above. The "severity measure" for the PTT-out-early SQI may be determined as a function of one or more of (1) the degree to which breathFilteredFramePower exceeds SPEECH_THRESHOLD for each frame, in line (24) of TABLE 3, and (2) the degree to which SILENCE_DETECTION_FRAMES_PTTOUT exceeds the quantity (frameCounter-lastSpeechFrame) in line (34) of TABLE 3. One version of the functional form of this severity measure may be a linear combination of the elements just enumerated, with appropriately chosen constants. Another version of the functional form may be a neural network of the elements just enumerated. Other variations are possible.

SQI Computations: Utterance-Too-Loud

The computation of the utterance-too-loud SQI works by analyzing the number of frames that have acoustic energy above a particular fixed threshold. This count is then compared with the total number of non-silent frames in the utterance. The determination of whether or not a frame is "non-silent" is itself made by comparing the acoustic energy against a different fixed threshold. If the ratio of these two quantities is greater than a given fixed quantity then the utterance-too-loud SQI is asserted.

This algorithm uses the C0 element of the so-called MFCC vector, which is the output of the discrete cosine transfer (DCT) step of the front end computation described above, and also the C0 element of the normalized MFCC vector, which is the output of the normalization step. This is a convenience, and yields an especially efficient implementation, since the front end computation must be performed in any event for the utterance to be recognized. However, it is to be understood that these same or similar computations may be carried out independent of the front end computation, and this disclosure likewise contemplates such variations.

The details of the computation are expressed in TABLE 4 below, which is executed for each complete utterance.

TABLE 4

Utterance-too-loud SQI

| (1) | // Constants |
| (2) | UTT_TOO_LOUD_RATIO = (typically around 0.40); |
| (3) | LOUD_FRAME_UNNORM_C0_THRESHOLD = (experimentally derived); |
| (4) | SILENCE_FRAME_NORM_C0_THRESHOLD = (experimentally derived); |
| (5) | |
| (6) | // Initialization |

TABLE 4-continued

Utterance-too-loud SQI

```
(7)     tooLoudFrameCounter = 0;
(8)     nonSilentFrameCounter = 0;
(9)
(10)    // Main Algorithm
(11)    // utterance loop
(12)    for each frame of the utterance {
(13)        // count non-silent frames
(14)        if ((frame normalized C0 value) >
(15)            SILENCE_FRAME_NORM_C0_THRESHOLD) {
(16)            nonSilentFrameCounter = nonSilentFrameCounter + 1;
(17)        }
(18)        // count too-loud frames
(19)        if      (-(frame      C0      value)      >
            LOUD_FRAME_UNNORM_C0_THRESHOLD) {
(20)            tooLoudFrameCounter = tooLoudFrameCounter + 1;
(21)        }
(22)    }
(23)
(24)    // SQI determination
(25)    if ((nonSilentFrameCounter > 0) &&
(26)        ((tooLoudFrameCounter / nonSilentFrameCounter) >
(27)        UTT_TOO_LOUD_RATIO)) {
(28)        (assert utterance-too-loud SQI);
(29)    }
(30)    else {
(31)        (do not assert utterance-too-loud SQI);
(32)    }
```

The division embodied in line (26) of TABLE 4 is to be made between two real numbers, which comprise both integer and fractional parts, yielding a result that is also a real number, comprising both integer and fractional parts. Thus, the normal C++ semantics of the ratio of two integer values do not apply.

In the context of confidence thresholding, the notion of a "severity measure" was introduced above. A "severity measure" for the utterance-too-loud SQI may be determined as a function of one or more of (1) the degree to which (frame C0 value) exceeds LOUD_FRAME_UNNORM_C0_THRESHOLD for each frame, in line (19) of TABLE 4, and (2) the degree to which the ratio (tooLoudFrameCounter/nonSilentFrameCounter) exceeds UTT_TOO_LOUD_RATIO in lines (26) and (27) of TABLE 4. One version of the functional form of this severity measure may be a linear combination of the elements just enumerated, with appropriately chosen constants. Another version of the functional form may be a neural network of the elements just enumerated. Other variations are possible.

SQI Computations: Utterance-Too-Soft

The computation of the utterance-too-soft SQI works by analyzing the number of frames that have acoustic energy above a particular fixed threshold. This count is then compared with the total number of non-silent frames in the utterance. If the ratio of these two quantities is smaller than a given fixed quantity then the utterance-too-soft SQI is asserted.

Like the utterance-too-loud computation, this algorithm uses the C0 element of the MFCC vector and the C0 element of the normalized MFCC vector. However, it is to be understood that these same or similar computations may be carried out independent of the front end computation, and this disclosure contemplates variations such as these.

The details of the computation are expressed in TABLE 5 below, which is executed for each complete utterance.

TABLE 5

Utterance-too-soft SQI

```
(1)     // Constants
(2)     UTT_TOO_SOFT_RATIO = (typically around 0.10);
(3)     SOFT_FRAME_UNNORM_C0_THRESHOLD =
        (experimentally derived);
(4)     SILENCE_FRAME_NORM_C0_THRESHOLD =
        (experimentally derived);
(5)
(6)     // Initialization
(7)     notTooSoftFrameCounter = 0;
(8)     nonSilentFrameCounter = 0;
(9)
(10)    // Main Algorithm
(11)    // utterance loop
(12)    for each frame of the utterance {
(13)        // count non-silent frames
(14)        if ((frame normalized C0 value) >
(15)            SILENCE_FRAME_NORM_C0_THRESHOLD) {
(16)            nonSilentFrameCounter = nonSilentFrameCounter + 1;
(17)        }
(18)        // count too-loud frames
(19)        if      (-(frame      C0      value)      >
            SOFT_FRAME_UNNORM_C0_THRESHOLD) {
(20)            notTooSoftFrameCounter = notTooSoftFrameCounter + 1;
(21)        }
(22)    }
(23)
(24)    // SQI determination
(25)    if ((nonSilentFrameCounter > 0) &&
(26)        ((notTooSoftFrameCounter / nonSilentFrameCounter) <
(27)        UTT_TOO_SOFT_RATIO)) {
(28)        (assert utterance-too-soft SQI);
(29)    }
(30)    else {
(31)        (do not assert utterance-too-soft SQI);
(32)    }
```

The division embodied in line (26) of TABLE 5 is to be made between two real numbers, which comprise both integer and fractional parts, yielding a result that is also a real number, comprising both integer and fractional parts. Hence, the normal C++ semantics of the ratio of two integer values do not apply.

In the context of confidence thresholding, the notion of a "severity measure" was introduced above. A "severity measure" for the utterance-too-soft SQI may be determined as a function of one or more of (1) the degree to which the quantity (frame C0 value) exceeds SOFT_FRAME_UNNORM_C0_THRESHOLD for each frame, in line (19) of TABLE 5, and (2) the degree to which UTT_TOO_SOFT_RATIO exceeds the ratio (notTooSoftFrameCounter/nonSilentFrameCounter) in lines (26) and (27) of TABLE 5. One version of the functional form of this severity measure may be a linear combination of the elements just enumerated, with appropriately chosen constants. Another version of the functional form may be a neural network of the elements just enumerated. Other variations are possible.

SQI Computations: Microphone-Too-Near

Introduction

The computation of the microphone-too-near SQI (and the companion microphone-too-far SQI) works by exploiting the so-called "near field effect," which is well-known in physical acoustics.

One consequence of this effect is that the low-frequency responsiveness of a microphone to a point-like audio source, such as the human mouth, varies with the distance between the source and the microphone. Specifically, as the separation of the source and the microphone increases, the amount of low-frequency acoustic energy captured by the microphone decreases, with respect to the total amount of acoustic energy captured from the same source.

In more detail, the computation of the microphone-too-near SQI proceeds by comparing the amount of low-frequency acoustic energy in the utterance with the amount of acoustic energy in all frequencies in the utterance. If this comparison shows an excessively large amount of low-frequency acoustic energy, the microphone-too-near SQI is asserted.

Two examples are given for making this determination, one based upon the accumulation, by frequency, of acoustic energy in the utterance, and the other based upon estimating the slope of the low-frequency portion of the spectrum. However, this disclosure is independent of any particular method of exploiting the near-field effect, and ordinarily skilled artisans (having the benefit of this disclosure) may recognize further techniques of applicability here.

Microphone-Too-Near Method #1

In this method, the acoustic energy present in the low-frequency portion of the utterance is accumulated, along with the total acoustic energy present in the utterance (both optionally exclusive of breath noise energy). The ratio of these two quantities is compared with a prespecified fixed value. If the ratio exceeds this value, the microphone-too-near SQI is asserted.

The details of Microphone-too-near Method #1 are expressed in TABLE 6 below, which is executed for each complete utterance.

TABLE 6

Microphone-too-near SQI, Method (1)

| | |
|---|---|
| (1) | // Constants |
| (2) | BREATH_NOISE_FILTER_BIN = (FFT bin corresponding to 150 Hz); |
| (3) | LOW_FREQUENCY_CUTOFF_BIN = (FFT bin of low frequency cutoff); |
| (4) | FFT_BIN_LIMIT = ((N/2), where N is the number of FFT bins); |
| (5) | MIC_TOO_NEAR_POWER_RATIO = (experimentally determined value); |
| (6) | |
| (7) | // Initialization |
| (8) | lowFrequencyPower = 0; |
| (9) | totalPower = 0; |
| (10) | |
| (11) | // Main Algorithm |
| (12) | // utterance loop |
| (13) | for each frame of the utterance { |
| (14) |   // accumulate frame power |
| (15) |   for (i = 0; i <= FFT_BIN_LIMIT; i = i + 1) { |
| (16) |     if (i > BREATH_NOISE_FILTER_BIN) { |
| (17) |       totalPower = totalPower + |
| (18) |         (bin i of FFT magnitude squared output); |
| (19) |       if (i <= LOW_FREQUENCY_CUTOFF_BIN) { |
| (20) |         lowFrequencyPower = lowFrequencyPower + |
| (21) |           (bin i of FFT magnitude squared output); |
| (22) |       } |
| (23) |     } |
| (24) |   } |
| (25) | } |
| (26) | |
| (27) | // SQI determination |
| (28) | if ((totalPower > 0) && |
| (29) |   ((lowFrequencyPower / totalPower) > |
| (30) |     MIC_TOO_NEAR_POWER_RATIO)) { |
| (31) |   (assert microphone-too-near SQI); |
| (32) | } |
| (33) | else { |
| (34) |   (do not assert microphone-too-near SQI); |
| (35) | } |

The division embodied in line (29) of TABLE 6 is to be made between two real numbers, which comprise both integer and fractional parts, yielding a result that is also a real number, comprising both integer and fractional parts. Hence, the normal C++ semantics of the ratio of two integer values do not apply.

In the context of confidence thresholding, the notion of a "severity measure" was introduced above. A "severity measure" for the microphone-too-near SQI, as computed by this method, may be determined as a function of the degree to which the ratio (lowFrequencyPower/totalPower) exceeds MIC_TOO_NEAR_POWER_RATIO in lines (29) and (30) of TABLE 6. One version of the functional form of this severity measure may be a linear combination of the elements just enumerated, with appropriately chosen constants. Another version of the functional form may be a neural network of the elements just enumerated. Other variations are possible.

Microphone-Too-Near Method #2

In this method, the acoustic energy present in each low-frequency FFT bin is accumulated over the utterance, for each bin. The resulting set of <bin number, energy in bin> pairs is then treated as a collection of samples of a continuous function, which represents the estimated spectrum of the utterance. A least-mean-squares linear fit to this function is then computed, and the slope of the resulting linear equation is extracted. The value of this slope is then compared to a predetermined fixed value. If this slope is too low (that is, the low-frequency portion of the estimated spectrum is too flat), the microphone-too-near SQI is asserted.

The details of Microphone-too-near Method #2 are expressed in TABLE 7 below, which is executed for each complete utterance.

TABLE 7

Microphone-too-near SQI, Method #2

| | |
|---|---|
| (1) | // Constants |
| (2) | BREATH_NOISE_FILTER_BIN = (FFT bin corresponding to 150 Hz); |
| (3) | LOW_FREQUENCY_CUTOFF_BIN = (FFT bin of low frequency cutoff); |
| (4) | MIC_TOO_NEAR_SLOPE = (experimentally determined value); |
| (5) | |
| (6) | // Initialization |
| (7) | for (i = BREATH_NOISE_FILTER_BIN + 1; |
| (8) |   i <= LOW_FREQUENCY_CUTOFF_BIN; |
| (9) |   i = i + 1) { |
| (10) |   lowFreqSpectrum[i] = 0; |
| (11) | } |
| (12) | |
| (13) | // Main Algorithm |
| (14) | // utterance loop |
| (15) | for each frame of the utterance { |
| (16) |   // accumulate frame power |
| (17) |   for (i = BREATH_NOISE_FILTER_BIN+1; |
| (18) |     i <= LOW_FREQUENCY_CUTOFF_BIN; |
| (19) |     i = i + 1) { |
| (20) |     lowFreqSpectrum[i] = lowFreqSpectrum[i] + |
| (21) |       (bin i of FFT magnitude squared output); |
| (22) |   } |
| (23) | } |
| (24) | |
| (25) | // perform least mean squares fit of low frequency spectrum |
| (26) | (fit equation E = (spectrum slope) * F + (spectrum intercept) |
| (27) |   to the set of values { <bin number, energy in bin> }, where F |
| (28) |   represents bin number, and E represents energy in bin); |
| (29) | |
| (30) | // SQI determination |
| (31) | if ( (spectrum slope) < MIC_TOO_NEAR_SLOPE) { |

TABLE 7-continued

Microphone-too-near SQI, Method #2

```
(32)        (assert microphone-too-near SQI);
(33)    }
(34)    else {
(35)        (do not assert microphone-too-near SQI);
(36)    }
```

A "severity measure" for this SQI, as computed by this method, may be determined as a function of one or more of (1) the goodness of fit of the linear equation, as computed in lines (26) through (28) of TABLE 7, and (2) the degree to which MIC_TOO_NEAR_SLOPE exceeds the quantity (spectrum slope) in line (31) of TABLE 7. The use of this severity measure figure in the discussion of Confidence Thresholding for Signal Quality Indicator Reporting, above. One version of the functional form of this severity measure may be a linear combination of the elements just enumerated, with appropriately chosen constants. Another version of the functional form may be a neural network of the elements just enumerated. Other variations are possible.

SQI Computations: Microphone-Too-Far

Introduction

As for the microphone-too-near SQI, the computation proceeds by comparing the amount of low-frequency acoustic energy in the utterance with amount of acoustic energy in all frequencies in the utterance. If this comparison shows an excessively small amount of low-frequency acoustic energy, the microphone-too-far SQI is asserted.

Two examples are given for making this determination. However, this disclosure is independent of any particular method of exploiting the near-field effect, and ordinarily skilled artisans (having the benefit of this disclosure) may recognize further techniques of applicability here.

Microphone-Too-Far Example #1

In this method, the acoustic energy present in the low-frequency portion of the utterance is accumulated, along with the total acoustic energy present in the utterance (both optionally exclusive of breath noise energy). The ratio of these two quantities is compared with a prespecified fixed value. If the ratio falls below this value, the microphone-too-far SQI is asserted.

The details of Microphone-too-far Method #1 are expressed in TABLE 8 below, which is executed for each complete utterance.

TABLE 8

Microphone-too-far SQI, Method #1

```
(1)    // Constants
(2)    BREATH_NOISE_FILTER_BIN = (FFT bin corresponding to
       150 Hz);
(3)    LOW_FREQUENCY_CUTOFF_BIN = (FFT bin of low
       frequency cutoff);
(4)    FFT_BIN_LIMIT = ((N/2), where N is the number of FFT
       bins);
(5)    MIC_TOO_FAR_POWER_RATIO = (experimentally
       determined value);
(6)
(7)    // Initialization
(8)    lowFrequencypower = 0;
(9)    totalPower = 0;
(10)
(11)   // Main Algorithm
(12)   // utterance loop
(13)   for each frame of the utterance {
(14)       // accumulate frame power
(15)       for (i = 0; i <= FFT_BIN_LIMIT; i = i + 1) {
```

TABLE 8-continued

Microphone-too-far SQI, Method #1

```
(16)           if (i > BREATH_NOISE_FILTER_BIN) {
(17)               totalPower = totalPower +
(18)                   (bin i of FFT magnitude squared
                   output);
(19)               if (i <= LOW_FREQUENCY_CUTOFF_BIN) {
(20)                   lowFrequencyPower = lowFrequencyPower +
(21)                       (bin i of FFT magnitude squared
                   output);
(22)               }
(23)           }
(24)       }
(25)   }
(26)
(27)   // SQI determination
(28)   if ((totalPower > 0) &&
(29)       ((lowFrequencyPower / totalPower) <
(30)           MIC_TOO_FAR_POWER_RATIO)) {
(31)       (assert microphone-too-far SQI);
(32)   }
(33)   else {
(34)       (do not assert microphone-too-far SQI);
(35)   }
```

The division embodied in line (29) of TABLE 8 is to be made between two real numbers, which comprise both integer and fractional parts, yielding a result that is also a real number, comprising both integer and fractional parts. Hence, the normal C++ semantics of the ratio of two integer values do not apply.

A "severity measure" for the microphone-too-far SQI, as computed by this method, may be determined as a function of the degree to which MIC_TOO_FAR_POWER_RATIO exceeds the ratio (lowFrequencyPower/totalPower) in lines (29) and (30) of TABLE 8. The use of this severity measure figures in the discussion of Confidence Thresholding for Signal Quality Indicator Reporting, above. One version of the functional form of this severity measure may be a linear combination of the elements just enumerated, with appropriately chosen constants. Another version of the functional form may be a neural network of the elements just enumerated. Other variations are possible.

Microphone-Too-Far Method #2

In this method, the acoustic energy present in each low-frequency FFT bin is accumulated over the utterance, for each bin. The resulting set of <bin number, energy in bin> pairs is then treated as a collection of samples of a continuous function, which represents the estimated spectrum of the utterance. A least-mean-squares linear fit to this function is then computed, and the slope of the resulting linear equation is extracted. The value of this slope is then compared to a predetermined fixed value. If this slope is too high (that is, the low-frequency portion of the estimated spectrum is too steep), the microphone-too-far SQI is asserted.

The details of Microphone-too-far Method (2) are expressed in TABLE 9 below, which is executed for each complete utterance.

TABLE 9

Microphone-too-far SQI, Method #2

```
(1)    // Constants
(2)    BREATH_NOISE_FILTER_BIN = (FFT bin corresponding to
       150 Hz);
(3)    LOW_FREQUENCY_CUTOFF_BIN  =  (FFT bin of low
       frequency cutoff);
(4)    MIC_TOO_FAR_SLOPE = (experimentally determined value);
(5)
```

TABLE 9-continued

Microphone-too-far SQI, Method #2

```
(6)     // Initialization
(7)     for (i = BREATH_NOISE_FILTER_BIN + 1;
(8)         i <= LOW_FREQUENCY_CUTOFF_BIN;
(9)         i = i + 1) {
(10)        lowFreqSpectrum[i] = 0;
(11)    }
(12)
(13)    // Main Algorithm
(14)    // utterance loop
(15)    for each frame of the utterance {
(16)        // accumulate frame power
(17)        for (i = BREATH_NOISE_FILTER_BIN+1;
(18)            i <= LOW_FREQUENCY_CUTOFF_BIN;
(19)            i = i + 1) {
(20)            lowFreqSpectrum[i] = lowFreqSpectrum[i] +
(21)                (bin i of FFT magnitude squared output);
(22)        }
(23)    }
(24)
(25)    // perform least mean squares fit of low frequency
        spectrum
(26)    (fit equation  E = (spectrum slope) * F + (spectrum
        intercept)
(27)        to the set of values { <bin number, energy in bin> },
        where F
(28)        represents bin number, and E represents energy in
        bin);
(29)
(30)    // SQI determination
(31)    if ( (spectrum slope) > MIC_TOO_FAR_SLOPE) {
(32)        (assert microphone-too-far SQI);
(33)    }
(34)    else {
(35)        (do not assert microphone-too-far SQI);
(36)    }
```

A "severity measure" for this SQI, as computed by this method, may be determined as a function of one or more of (1) the goodness of fit of the linear equation, as computed in lines (26) through (28) of TABLE 9, and (2) the degree to which MIC_TOO_NEAR_SLOPE exceeds the quantity (spectrum slope) in line (31) of TABLE 9. The use of this severity measure figures in the discussion of Confidence Thresholding for Signal Quality Indicator Reporting, above. One version of the functional form of this severity measure may be a linear combination of the elements just enumerated, with appropriately chosen constants. Another version of the functional form may be a neural network of the elements just enumerated. Other variations are possible.

3. Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC. 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-driven method to regulate a speaker's issuance of speech based commands, the method comprising operations of:
   receiving an input signal representing audio content including speech of the speaker, the audio content occurring between a prescribed begin event and a prescribed end event;
   processing at least a portion of the input signal to determine whether the processed portion of the input signal contains speech exhibiting one or more predetermined conditions capable of posing difficulty in successfully performing speech recognition upon the input signal;
   where the processed portion of the input signal comprises one of: all of the input signal, a part of the input signal, speech present in the input signal;
   if the processing operation determines that the processed portion of the input signal contains speech exhibiting one or more of the predetermined conditions, then performing operations comprising: issuing at least one human comprehensible speech quality alert corresponding to each exhibited predetermined condition;

the processing operation comprising:
  determining whether the speaker was speaking too loudly relative to prescribed criteria;
the operation of determining whether the speaker was speaking too loudly relative to prescribed criteria comprising:
  computing a non-silent-frame-count by computing a total number of frames of the input signal with acoustic energy above a first threshold;
  computing a loud-frame-count by computing a total number of frames of the input signal with acoustic energy above a second threshold higher than the first threshold;
  computing a ratio between the loud-frame-count and the non-silent-frame-count;
  determining whether the ratio exceeds a third threshold, and if so, concluding that the speaker was speaking too loudly relative to the prescribed criteria.

2. The method of claim 1,
the operations further comprising receiving activation and deactivation of a push-to-talk mechanism;
the activation and the deactivation defining the begin event and end event, respectively;
the processing operation comprising:
  determining whether the speaker began speaking before activation of the push-to-talk mechanism.

3. The method of claim 2, the operation of determining whether the speaker began speaking before activation of the push-to-talk mechanism comprising:
  applying a predetermined speech detection process to the input signal;
  determining whether the input signal contains detected speech occurring within a predetermined time period after the begin event, and if so, concluding that the speaker began speaking before activation of the push-to-talk mechanism.

4. The method of claim 1,
the operations further comprising receiving activation and deactivation of a push-to-talk mechanism;
the activation and the deactivation defining the begin event and end event, respectively;
the processing operation comprising: determining whether the speaker was still speaking upon deactivation of the push-to-talk mechanism.

5. The method of claim 4, the operation of determining whether the speaker was still speaking upon deactivation of the push-to-talk mechanism comprising:
  applying a predetermined speech detection process to the input signal;
  determining whether the input signal contains detected speech occurring within a predetermined time period before the end event, and if so, concluding that the speaker was still speaking upon deactivation of the push-to-talk mechanism.

6. The method of claim 3 or 5, where the operation of applying the predetermined speech detection process further comprises:
  excluding breath noise from consideration as speech.

7. The method of claim 3 or 5, where the operation of applying the predetermined speech detection process further comprises:
  excluding energy of a prescribed frequency range from consideration as speech.

8. The method of claim 1, the operation of determining whether the speaker was speaking too loudly relative to prescribed criteria comprising:
  computing one of the following quantities:
    acoustic energy of the input signal, acoustic energy of speech of the input signal;
  determining whether the computed quantity exceeds a prescribed maximum, and if so, concluding that the speaker was speaking too loudly relative to prescribed criteria.

9. The method of claim 1, the operation of processing at least a portion of the input signal comprising one or more of:
  computing one or more acoustic signal quality indicators each indicating an affirmative output when the processed portion of the input signal contains speech exhibiting a corresponding one of the predetermined conditions;
  computing one or more acoustic signal quality indicators each functionally related to a degree of presence of a corresponding one of the predetermined conditions.

10. The method of claim 1, the operations further comprising:
  receiving or calculating an utterance confidence score representing a likelihood that results of speech recognition performed upon the input signal are correct;
  comparing the utterance confidence score with a prescribed threshold;
  if the utterance confidence score exceeds the prescribed threshold, omitting performance of one or both of the following:
  the operation of processing at least a portion of the input signal as to one or more of the predetermined conditions;
  the operation of issuing the at least one human comprehensible speech quality alert.

11. The method of claim 10, where:
the comparing operation uses different prescribed thresholds corresponding to different predetermined conditions;
the omitting operation is only performed for each of the predetermined conditions whose corresponding prescribed threshold was not exceeded by the utterance confidence score.

12. The method of claim 1, where:
the operations further comprise receiving or calculating an utterance confidence score representing a likelihood that results of speech recognition performed upon the input signal are correct;
the operation of processing at least the portion of the input signal comprises:
  computing one or more acoustic signal quality indicators each functionally related to a degree of presence of a corresponding one of the predetermined conditions;
  applying a predetermined function to each combination of: computed acoustic signal quality indicator and utterance confidence score;
the operations further comprise:
  if the input signal contains speech exhibiting a given one of the predetermined conditions, suspending issuance of the human comprehensible speech quality alert corresponding to the given predetermined condition if the application of the predetermined function to the utterance confidence score and the acoustic signal quality indicator corresponding to the given predetermined condition yields a predetermined result.

13. A computer-driven method to regulate a speaker's issuance of speech based commands, the method comprising operations of:

receiving an input signal representing audio content including speech of the speaker, the audio content occurring between a prescribed begin event and a prescribed end event;

processing at least a portion of the input signal to determine whether the processed portion of the input signal contains speech exhibiting one or more predetermined conditions capable of posing difficulty in successfully performing speech recognition upon the input signal;

where the processed portion of the input signal comprises one of: all of the input signal, a part of the input signal, speech present in the input signal;

if the processing operation determines that the processed portion of the input signal contains speech exhibiting one or more of the predetermined conditions, then performing operations comprising: issuing at least one human comprehensible speech quality alert corresponding to each exhibited predetermined condition;

the processing operation comprising:
  determining whether the speaker was speaking too softly relative to prescribed criteria;
the operation of determining whether the speaker was speaking too softly relative to prescribed criteria comprising:
  computing a non-silent-frame-count by computing a total number of frames of the input signal that have acoustic energy above a first threshold;
  computing a soft-frame-count by computing a total number of frames of the input signal that have acoustic energy less than a second threshold;
  computing a ratio between the soft-frame-count and the non-silent-frame-count;
  determining whether the ratio is greater than a third threshold, and if so, concluding that the speaker was speaking too softly relative to the prescribed criteria.

14. The method of claim 13, the operation of determining whether the speaker was speaking too softly relative to prescribed criteria comprising:
  computing one of the following quantities:
    acoustic energy of the input signal, acoustic energy of speech of the input signal;
  determining whether the computed quantity is less than a predetermined minimum, and if so, concluding that the speaker was speaking too softly relative to prescribed criteria.

15. The method of claim 8 or 14, where the computing operation comprises one of:
  analyzing raw audio stream;
  analyzing mel frequency cepstral coefficients.

16. The method of claim 8 or 14, the operations further comprising
  utilizing the input signal to compute a C0 element of a mel-frequency cepstral coefficient vector;
  the computing operation utilizing the computed C0 element.

17. A non-transitory computer medium storing one of (1) a program to perform operations for regulating a speaker's issuance of speech-based commands, or (2) a program for installing a target program of machine-readable instructions on a computer, where the target program is executable to perform the operations for regulating a speaker's issuance of speech-based commands, the operations comprising:
  receiving an input signal representing audio content including speech of the speaker, the audio content occurring between a prescribed begin event and a prescribed end event;
  processing at least a portion of the input signal to determine whether the processed portion of the input signal contains speech exhibiting one or more predetermined conditions capable of posing difficulty in successfully performing speech recognition upon the input signal;
  where the processed portion of the input signal comprises one of: all of the input signal, a part of the input signal, speech present in the input signal;
  if the processing operation determines that the processed portion of the input signal contains speech exhibiting one or more of the predetermined conditions, then performing operations comprising:
  issuing at least one human comprehensible speech quality alert corresponding to each exhibited predetermined condition;
  where the input signal originated from a microphone;
  the processing operation comprising:
    determining whether the microphone was held too near to the speaker; and
    determining whether the speaker was speaking too loudly relative to prescribed criteria;
  the operation of determining whether the speaker was speaking too loudly relative to prescribed criteria comprising:
    computing a non-silent-frame-count by computing a total number of frames of the input signal with acoustic energy above a first threshold;
    computing a loud-frame-count by computing a total number of frames of the input signal with acoustic energy above a second threshold higher than the first threshold;
    computing a ratio between the loud-frame-count and the non-silent-frame-count;
    determining whether the ratio exceeds a third threshold, and if so, concluding that the speaker was speaking too loudly relative to the prescribed criteria.

18. A non-transitory computer medium storing one of (1) a program to perform operations for regulating a speaker's issuance of speech-based commands, or (2) a program for installing a target program of machine-readable instructions on a computer, where the target program is executable to perform the operations for regulating a speaker's issuance of speech-based commands, the operations comprising:
  receiving an input signal representing audio content including speech of the speaker, the audio content occurring between a prescribed begin event and a prescribed end event;
  processing at least a portion of the input signal to determine whether the processed portion of the input signal contains speech exhibiting one or more predetermined conditions capable of posing difficulty in successfully performing speech recognition upon the input signal;
  where the processed portion of the input signal comprises one of: all of the input signal, a part of the input signal, speech present in the input signal;
  if the processing operation determines that the processed portion of the input signal contains speech exhibiting one or more of the predetermined conditions, then performing operations comprising:
  issuing at least one human comprehensible speech quality alert corresponding to each exhibited predetermined condition;
  where the input signal originated from a microphone;
  the processing operation comprising:
    determining whether the microphone was held too near to the speaker; and
    determining whether the speaker was speaking too softly relative to prescribed criteria;

the operation of determining whether the speaker was speaking too softly relative to prescribed criteria comprising:
   computing a non-silent-frame-count by computing a total number of frames of the input signal that have acoustic energy above a first threshold;
   computing a soft-frame-count by computing a total number of frames of the input signal that have acoustic energy less than a second threshold;
   computing a ratio between the soft-frame-count and the non-silent-frame-count;
   determining whether the ratio is greater than a third threshold, and if so, concluding that the speaker was speaking too softly relative to the prescribed criteria.

19. A non-transitory computer medium having program instructions stored therein which, when executed by a processor, perform operations comprising:
   receiving an input signal representing audio content including speech of the speaker, the audio content occurring between a prescribed begin event and a prescribed end event;
   processing at least a portion of the input signal to determine whether the processed portion of the input signal contains speech exhibiting one or more predetermined conditions capable of posing difficulty in successfully performing speech recognition upon the input signal;
   where the processed portion of the input signal comprises one of:
      all of the input signal, a part of the input signal, speech present in the input signal;
   if the processing operation determines that the processed portion of the input signal contains speech exhibiting one or more of the predetermined conditions, then performing operations comprising: issuing at least one human comprehensible speech quality alert corresponding to each exhibited predetermined condition;
   the processing operation comprising:
      determining whether the speaker was speaking too loudly relative to prescribed criteria;
   the operation of determining whether the speaker was speaking too loudly relative to prescribed criteria comprising:
      computing a non-silent-frame-count by computing a total number of frames of the input signal with acoustic energy above a first threshold;
      computing a loud-frame-count by computing a total number of frames of the input signal with acoustic energy above a second threshold higher than the first threshold;
      computing a ratio between the loud-frame-count and the non-silent-frame-count;
      determining whether the ratio exceeds a third threshold, and if so, concluding that the speaker was speaking too loudly relative to the prescribed criteria.

20. The non-transitory computer medium of claim 19,
   the operations further comprising receiving activation and deactivation of a push-to-talk mechanism;
   the activation and the deactivation defining the begin event and end event, respectively;
   the processing operation comprising:
      determining whether the speaker began speaking before activation of the push-to-talk mechanism.

21. The non-transitory computer medium of claim 20, the operation of determining whether the speaker began speaking before activation of the push-to-talk mechanism comprising:
   applying a predetermined speech detection process to the input signal;
   determining whether the input signal contains detected speech occurring within a predetermined time period after the begin event, and if so, concluding that the speaker began speaking before activation of the push-to-talk mechanism.

22. The non-transitory computer medium of claim 19,
   the operations further comprising receiving activation and deactivation of a push-to-talk mechanism;
   the activation and the deactivation defining the begin event and end event, respectively;
   the processing operation comprising:
      determining whether the speaker was still speaking upon deactivation of the push-to-talk mechanism.

23. The non-transitory computer medium of claim 22, the operation of determining whether the speaker was still speaking upon deactivation of the push-to-talk mechanism comprising:
   applying a predetermined speech detection process to the input signal;
   determining whether the input signal contains detected speech occurring within a predetermined time period before the end event, and if so, concluding that the speaker was still speaking upon deactivation of the push-to-talk mechanism.

24. The non-transitory computer medium of claim 21 or 23, where the operation of applying the predetermined speech detection process further comprises:
   excluding breath noise from consideration as speech.

25. The non-transitory computer medium of claim 21 or 23, where the operation of applying the predetermined speech detection process further comprises:
   excluding energy of a prescribed frequency range from consideration as speech.

26. The non-transitory computer medium of claim 19, the processing operation comprising:
   determining whether the speaker was speaking too loudly relative to prescribed criteria.

27. The non-transitory computer medium of claim 26, the operation of determining whether the speaker was speaking too loudly relative to prescribed criteria comprising:
   computing one of the following quantities: acoustic energy of the input signal, acoustic energy of speech of the input signal;
   determining whether the computed quantity exceeds a prescribed maximum, and if so, concluding that the speaker was speaking too loudly relative to prescribed criteria.

28. The non-transitory computer medium of claim 19, the processing operation comprising:
   determining whether the speaker was speaking too softly relative to prescribed criteria.

29. The non-transitory computer medium of claim 28, the operation of determining whether the speaker was speaking too softly relative to prescribed criteria comprising:
   computing one of the following quantities:
      acoustic energy of the input signal, acoustic energy of speech of the input signal;
   determining whether the computed quantity is less than a predetermined minimum, and if so, concluding that the speaker was speaking too softly relative to prescribed criteria.

30. The non-transitory computer medium of claim 27 or 29, where the computing operation comprises one of:
   analyzing raw audio stream;
   analyzing mel frequency cepstral coefficients.

31. The non-transitory computer medium of claim 27 or 29, the operations further comprising utilizing the input signal to compute a C0 element of a mel-frequency cepstral coefficient vector;
the computing operation utilizing the computed C0 element.

32. The non-transitory computer medium of claim 19, the operation of processing at least a portion of the input signal comprising one or more of:
computing one or more acoustic signal quality indicators each indicating an affirmative output when the processed portion of the input signal contains speech exhibiting a corresponding one of the predetermined conditions;
computing one or more acoustic signal quality indicators each functionally related to a degree of presence of a corresponding one of the predetermined conditions.

33. The non-transitory computer medium of claim 19, the operations further comprising:
receiving or calculating an utterance confidence score representing a likelihood that results of speech recognition performed upon the input signal are correct;
comparing the utterance confidence score with a prescribed threshold;
if the utterance confidence score exceeds the prescribed threshold, omitting performance of one or both of the following:
the operation of processing at least a portion of the input signal as to one or more of the predetermined conditions;
the operation of issuing the at least one human comprehensible speech quality alert.

34. The non-transitory computer medium of claim 33, where:
the comparing operation uses different prescribed thresholds corresponding to different predetermined conditions;
the omitting operation is only performed for each of the predetermined conditions whose corresponding prescribed threshold was not exceeded by the utterance confidence score.

35. The non-transitory computer medium of claim 19, where:
the operations further comprise receiving or calculating an utterance confidence score representing a likelihood that results of speech recognition performed upon the input signal are correct;
the operation of processing at least the portion of the input signal comprises:
computing one or more acoustic signal quality indicators each functionally related to a degree of presence of a corresponding one of the predetermined conditions;
applying a predetermined function to each combination of:
computed acoustic signal quality indicator and utterance confidence score;
the operations further comprise:
if the input signal contains speech exhibiting a given one of the predetermined conditions, suspending issuance of the human comprehensible speech quality alert corresponding to the given predetermined condition if the application of the predetermined function to the utterance confidence score and the acoustic signal quality indicator corresponding to the given predetermined condition yields a predetermined result.

36. A non-transitory computer medium having program instructions stored therein which, when executed by a processor, perform operations comprising:
receiving an input signal representing audio content including speech of the speaker, the audio content occurring between a prescribed begin event and a prescribed end event;
processing at least a portion of the input signal to determine whether the processed portion of the input signal contains speech exhibiting one or more predetermined conditions capable of posing difficulty in successfully performing speech recognition upon the input signal;
where the processed portion of the input signal comprises one of:
all of the input signal, a part of the input signal, speech present in the input signal;
if the processing operation determines that the processed portion of the input signal contains speech exhibiting one or more of the predetermined conditions, then performing operations comprising: issuing at least one human comprehensible speech quality alert corresponding to each exhibited predetermined condition;
the processing operation comprising:
determining whether the speaker was speaking too softly relative to prescribed criteria;
the operation of determining whether the speaker was speaking too softly relative to prescribed criteria comprising:
computing a non-silent-frame-count by computing a total number of frames of the input signal that have acoustic energy above a first threshold;
computing a soft-frame-count by computing a total number of frames of the input signal that have acoustic energy less than a second threshold;
computing a ratio between the soft-frame-count and the non-silent-frame-count;
determining whether the ratio is greater than a third threshold, and if so, concluding that the speaker was speaking too softly relative to the prescribed criteria.

* * * * *